United States Patent Office

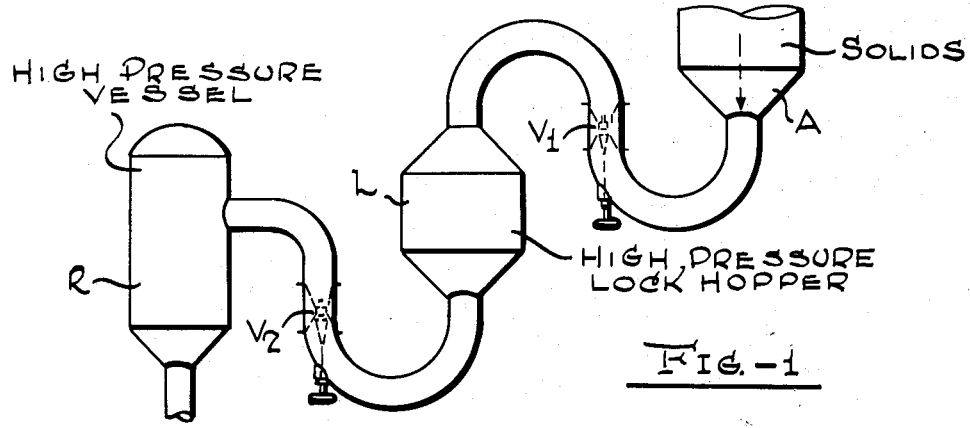
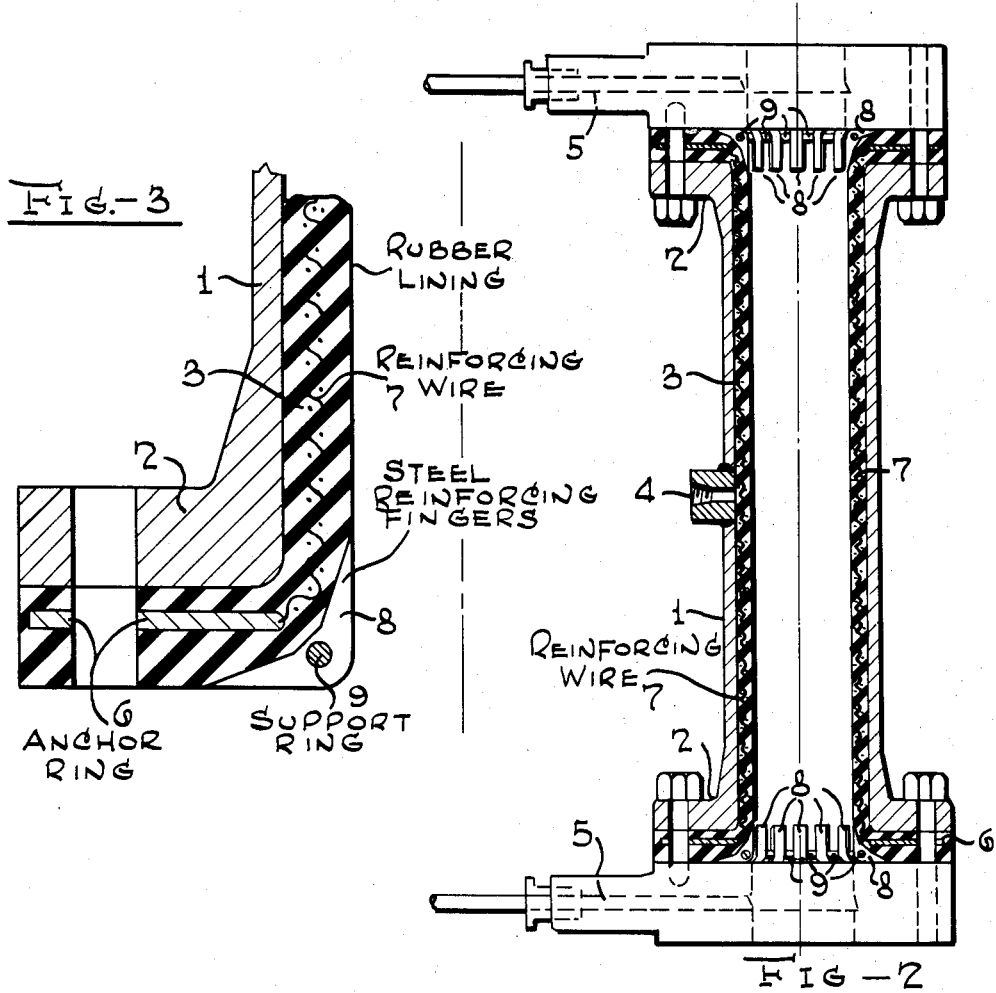

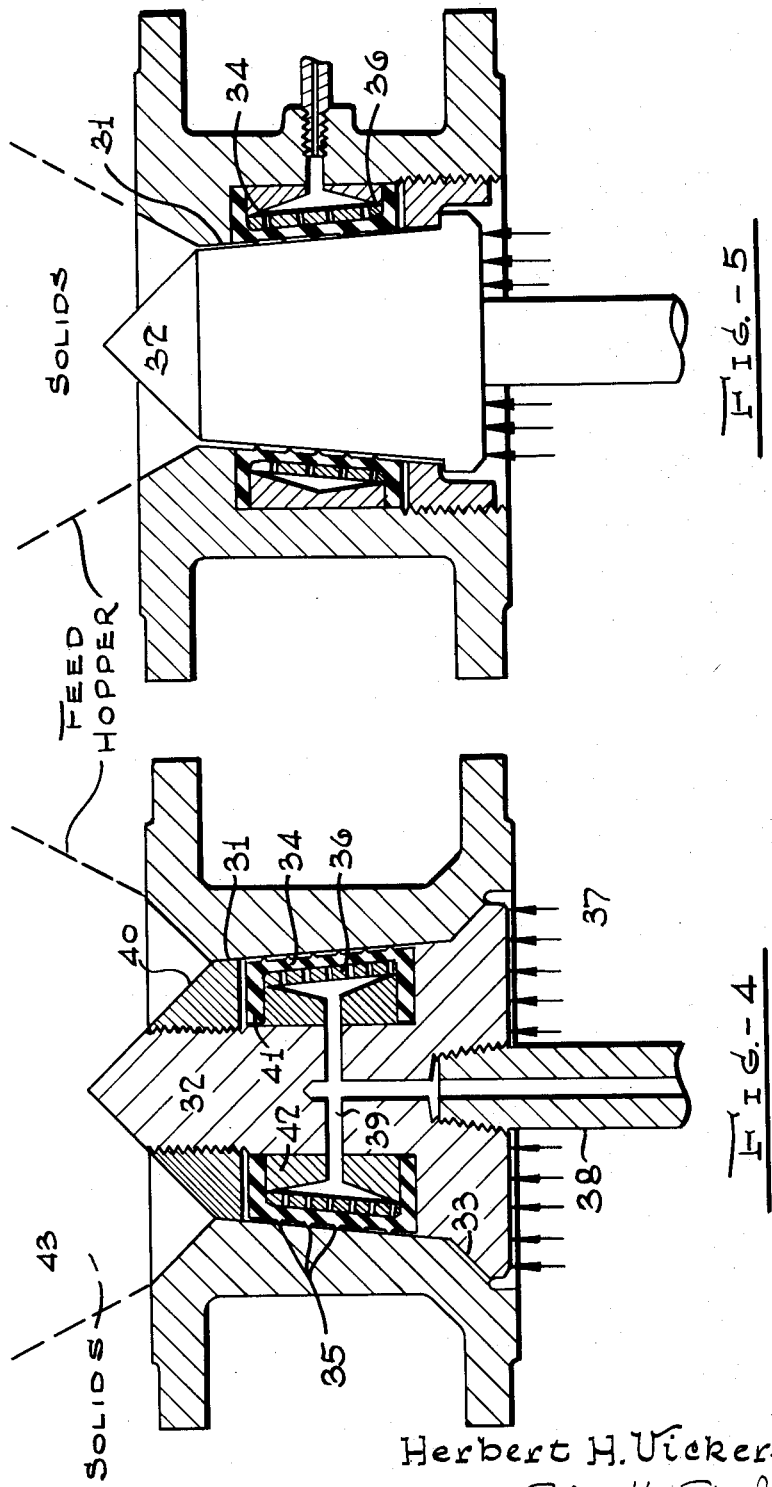

2,716,575
Patented Aug. 30, 1955

2,716,575

CONSTRICTION VALVE FOR FLUIDIZED SOLIDS

Herbert H. Vickers, Union, N. J., assignor to Esso Research and Engineering Company, a corporation of Delaware Application January 31, 1952, Serial No. 269,197

5 Claims. (Cl. 302—17)

This invention relates to a construction valve particularly adapted for controlling the flow of finely divided solids. The present valve is characterized by a flexible lining capable of constricting around a solid core and thus establishing an impervious seal.

In chemical processes generally and in petroleum refining particularly, the so-called fluidized solids technique has gained extensive use in recent years. In these processes, particles of solid catalyst or solid heat exchange medium or solid reactant are suspended in an upwardly flowing stream of gas. Under proper conditions it is possible to cause the gas flowing through the mass of finely divided solid particles to fluidize the latter so as to impart to the system the general characteristics and appearance of a liquid. Thus a bed of fluidized solids may be maintained having an upper level, having hydrostatic and hydrodynamic properties of a liquid and characterized by a turbulent movement of the solids particles throughout the fluidized bed.

In conducting a process utilizing this technique, it is generally necessary to pass the solids through various processing lines and to control the flow of the solids by suitable valves. Slide valves in particular have been used for this purpose. However, the nature of a stream of fluidized solids is such as to cause severe erosion and consequently the life of mechanical slide valves in a fluid system is of relatively short duration. With the advent of high-pressure fluid processes such as gasification of coal or hydroforming of naptha, and the use of lock hoppers as the most satisfactory pressurizing means, the problem of devising suitable erosion-resistant valves has become particularly acute.

It is therefore the main object of this invention to provide an improved valve adapted to control the flow of finely divided solids. This and other objects will become more clearly apparent from the subsequent description and the accompanying drawing.

In modern chemical processes such as the high pressuch gasification of coal, fluidized solids ranging in size up to about 500 microns must be moved, for instance, by means of lock hoppers or the like from an atmospheric stage to a high-pressure stage maintained at 200 to 500 lbs./sq. in. These lock hoppers require valves which are capable of repeatedly establishing a seal in the presence of finely divided solids and hold tight against the prevailing high pressures.

The greatest difficulty with conventional valves lies in their proper seating. The presence of even a small amount of solids can cause the valve to leak under high pressure and cause severe erosion of the seat, with resultant failure of the valve. To avoid this, it has been proposed previously to provide valves with a rubber seat which would allow the valves to close and seal in the presence of solids. However, repeated closures of such previous valves under high pressures resulted in a build-up of entrapped solids in the rubber seat, and consequent failure of valve due to channeling and erosion.

Valves constructed in accordance with this invention are free of the seating troubles described above and can be used for rapid and repeated closures under conditions which would quickly destroy the more conventional valves.

Typical embodiments of the invention are illustrated in the attached drawing wherein:

Fig. 1 is a schematic view of an illustrative system employing high pressure valves, details of which are shown in Figs. 2 to 5;

Fig. 2 is a central section through one type of the novel high pressure valve having an expandable or laterally distensible lining, showing the valve in open position;

Fig. 3 is an enlarged view of an end portion of the valve and elastic lining illustrated in Fig. 1;

Fig. 4 is a central vertical section through another type of valve containing a movable plug surrounded by an elastic lining which can be expanded against the valve seat, the valve being shown in closed position;

Fig. 5 is a central section through a similar valve wherein the elastic lining is attached to the valve seat and a movable valve plug against which the lining can be expanded, this valve being shown in closed position.

Referring specifically to Fig. 1, the system illustrated consists of an atmospheric hopper A from which solids such as powdered, fluidized coal can be passed at atmospheric pressure to a lock hopper L, and after pressurizing in lock hopper L the solids can be passed to a high pressure reactor R. High pressure valves $V_1$ and $V_2$ are provided on each side of lock hopper L, $V_1$ being open and $V_2$ closed when low pressure solids pass from A to L, and $V_1$ being closed and $V_2$ open when pressurized solids pass from L to R.

Referring now specifically to the new type of valve illustrated in Figs. 2 and 3, the valve may consist of a steel pipe or housing 1, which may be for example 5 feet long, flanged by flanges 2 on both ends, and have a 6-inch diameter. The pipe is lined with a strong elastic lining 3 and has a pressure connection 4. The lining may be made of natural or synthetic rubber or similar elastic materials such as various blends of vinyl chloride-acetate plastics, and is preferably reinforced with steel wires or wire mesh, plastic strands or cotton or rayon fabrics, or the like. Pressure can be applied to the outside of the rubber lining through connection 4 and cause it to constrict upon any material that it encloses. Pipe 1 is preferably provided at both ends, or at least at its downstream end, with simple auxiliary slide valves or cocks 5. The purpose of these cocks is to stop the free flow of the solids and trap a core or plug of these solids in pipe 1 around which plug the lining 3 may constrict. Because of the stated function of these auxiliary valves, they can have loose fitting slides not designed for pressure. The slide valve away from the pressure side may also help to carry the pressure load and prevent excessive extension of the rubber lining.

For instance, the valve shown in Figs. 2 and 3 may correspond to valve $V_2$ in the system shown in Fig. 1 and be used to control the flow of solids from pressurized lock hopper L to high pressure reactor R. Its operation will now be described for purposes of further illustration. Thus, when it may be desired to shut off the flow of solids from lock hopper L into reactor R, the auxiliary cock 5 on the reactor side of the valve is first closed to restrict the flow of solids.

Then after allowing sufficient time for valve tube 1 to become substantially filled with solids, the auxiliary cock 5 on the hopper side of the valve may be closed, confining a core of solids within the rubber lined tube. Hydraulic or pneumatic pressure may then be applied through connection 4 to the outside of the rubber lining 3, causing it to constrict upon the confined core of solids without requiring an excessive distension or deformation of the rubber lining.

As a result of this constriction, the confined core of solids is compacted into an impervious mass which can seal against several hundred pounds of pressure, and consequently the auxiliary valves 5 may be opened at this point. The pressure in the lock hopper L may now also be allowed to drop to atmospheric. Only a negligible amount of leakage takes place, depending largely upon the pressure used to constrict the rubber lining, the dimensions of the tube, the particle size and particles size distribution, as well as hardness or friability of the confined solids. Surprisingly complete imperviousness can thus be achieved since it has been found that under pressure the fines commonly present in powdered solids tend to pack within the interstices between the larger solid particles and thus the solids form their own seal or plug.

When it is desired to reopen the valve, it is desirable to bring the gas pressures at both ends of the valve into approximate balance. The hydraulic pressure on the lining may then be released. Consequently the lining snaps back to its unstretched condition and the resulting increase in valve volume causes the compacted core of solids to crumble and become fairly free flowing again and flow of powdered solids from pressurized lock hopper to the reactor is thus resumed. Without the change in valve volume obtained by the snapping back of the lining, it would be most difficult to cause disintegration of the compacted solids at the desired time.

The described valve will seal against pressures as high as 500 pounds per square inch, especially if the rubber lining is adequately reinforced as shown in Figure 3. Referring to Figure 3, the rubber lining 3 may be clamped between the flanges 2 and the auxiliary slide valve 5. Steel anchor rings 6 are preferably molded in the flanges or terminal portions of the rubber lining, and steel wires 7 or other reinforcing elements may extend lengthwise in the rubber lining from one end to the other and are preferably attached to the anchor rings 6. A number of segmented steel reinforcing fingers 8 may be supported on ring 9 and molded into the rubber lining 3 to reinforce the latter at both ends.

When desired, two or more of the rubber lined sections may be arranged in series with graduated pressures acting on the linings. In still another arrangement, two or more rubber lined sections may be arranged in parallel, like tubes in a tubular boiler and in such a case all the tubes can be served by one common auxiliary slide valve at each end.

A further modification of the present invention is illustrated in Figures 4 and 5 wherein the hydraulically or pneumatically expandable lining forms a seal against a portion of a valve plug or against the valve seat, instead of constricting a core of the finely divided solid particles. Referring specifically to Figure 4, the embodiment shown therein consists of a valve body having a tapered seat 31 into which a hydraulically expanded plug can be inserted to cut off the flow of solids and gases. The tapered plug 32 is designed to fit loosely in the valve seat 31 but it has a shoulder 33 to prevent the tapered section from wedging tight when subjected to high pressure. The plug 32 has an elastic jacket 34 of rubber or the like which can be hydraulically expanded to form a tight seal against the seat 31.

The outer face of this rubber jacket 34 preferably has a number of raised rings 35 designed to wipe the seat 31 as the valve closes and to form additional sealing rings around the face of the plug. The inside of the jacket is supported preferably by a perforated metal ring 36. A fluid such as air or water, under a pressure somewhat higher than the gas pressure in space 37 against which the valve must hold, can be fed to the inside of the jacket 34. This compressed fluid is piped from an outside source and may pass to jacket 34 through the operating rod 38 and through drilled holes 39 in the plug 32. Alternatively, a mechanically actuated circular spring or other mechanical pressure device may be used to apply pressure to the inside of jacket 34.

The rubber jacket 34 may be held in place by a lock nut 40 which screws onto the body of the plug. This lock nut 40 clamps upon flanges 41 of jacket 34 and may compress them against a collar 42. The collar may be an integral part of the perforated ring 36, so as to form a tight pressure seal against the compressed fluid fed to the inside of the jacket 34. The valve may be closed and opened by any conventional means which may be connected to the rod 38, which in turn may be attached to plug 32 either from below as shown or from above.

When the valve is open, the fluidized solids maintained under pressure in space 43 will flow through the tapered seat 31 of the valve and over the plug 32, and will sweep the plug and valve seat clean. As the valve is closed against these solids, the rubber ribs 35 will tend to wipe off the seat of the valve because of its slight taper, before the plug reaches its final closed position determined by shoulder 33 on the plug. After the valve is closed and the rubber jacket inflated or mechanically expanded, the valve will form a tight seal even if minor amounts of powdered solid are confined between jacket 34 and seat 31, since the inflation pressure under the jacket will be higher than the pressure against which the valve has to seal. The metal parts of the plug 32 form a loose closure in the valve seat and thereby confine the rubber jacket so that it can withstand the high inflation pressure.

Before the valve is opened the lining is preferably deflated to avoid any danger of rupture. Also, such periodic deflation is beneficial in that the concomitant flexing of the lining tends to release solids embedded or entrapped therein and thus contributes to the life and effectiveness of the lining. The illustrated valve is designed to operate with gas pressure on the underside and solids on top, and can be designed with a strength to withstand at least 500 pounds per square inch on the underside. However, it may also be used in inverted position if provided with a locking device such as a breech block or the like to hold against the high pressure. For low pressures, the breach block lock may not be required.

The embodiment shown in Figure 5 is a valve employing the same principle to obtain a tight seal as that described with reference to Figure 4. However, the valve shown in Figure 5 has the hydraulically expandable jacket 34 located in the valve seat 31, rather than in the moving plug 32 as shown in Figure 4. Of course, it will be understood that neither of these valves necessarily requires a tapered seat since a cylindrical plug and seat may often be equally satisfactory.

Various other adaptations of the presently described concept are possible with other types of valves without departing from the scope of the present invention. For instance, a pneumatic sealing ring can be inserted in the seat or moving part of a swing check valve, gate valve, slide valve, piston valve, etc. The subject matter sought to be protected by Letters Patent is particularly pointed out in the appended claims.

I claim:

1. A valve assembly for controlling the flow of a stream of finely fluidized solids therethrough comprising a tubular outer rigid housing, a tubular elastic lining impervious to fluid substantially adjacent to the entire inner surface of said housing when the valve is in normal open position to permit free flow of the fluidized solids therethrough, the edges of said lining being sealed against said housing to provide a substantially airtight region between the outer surface of said lining in the housing and the inner surface of the housing, means for effecting accumulation of the solids in the form of a core within the lining, and means for constricting the lining to compact the confined core into a mass substantially impervious to fluid under pressure.

2. A valve assembly for controlling the flow of a stream of finely divided fluidized solids therethrough comprising a tubular outer rigid housing, a tubular elastic lining impervious to fluid substantially adjacent to the entire inner surface of said housing when the valve is in normal open position to permit free flow of the fluidized solids therethrough, the edges of said lining being sealed against said housing to provide a substantially airtight region between the outer surface of said lining in the housing and the inner surface of the housing, a valve casing carried at the downstream end of the rigid housing, a valve in the valve casing loosely fitted therein to be gas pervious while blocking the solids whereby when the valve on the downstream side is closed the free flow therethrough of the solids in the fluidized stream is obstructed to accumulate a core of solids within the lining, and means for supplying fluid under pressure against the outer periphery of the lining to constrict the same to compact the confined core into a mass substantially impervious to fluid under pressure.

3. A valve assembly according to claim 2 wherein the valve on the downstream end of the rigid housing is a slide valve with a loose fitting slide.

4. A valve assembly for controlling the flow of a stream of finely divided fluidized solids therethrough comprising a tubular outer rigid housing, a tubular elastic lining impervious to fluid substantially adjacent to the entire inner surface of said housing when the valve is in normal open position to permit free flow of the fluidized solids therethrough, the edges of said lining being sealed against said housing to provide a substantially airtight region between the outer surface of said lining in the housing and the inner surface of the housing, valve casings carried at the upstream and downstream ends of the rigid housing, a valve in each valve casing loosely fitted therein to be gas pervious while blocking the solids whereby when the valve on the downstream side is closed the free flow therethrough of the solids in the fluidized stream is obstructed to accumulate a core of solids within the lining, the valve on the upstream side of the lining when closed confining the core of solids therein, and means for supplying fluid under pressure against the outer periphery of the lining to constrict the same to compact the confined core into a mass substantially impervious to fluid under pressure.

5. A valve assembly according to claim 4 wherein the valves on the upstream and downstream ends of the rigid housing are slide valves each with a loose fitting slide.

References Cited in the file of this patent

UNITED STATES PATENTS

| | | |
|---|---|---|
| 2,298,632 | Thorner | Oct. 13, 1942 |
| 2,470,744 | Korn | May 17, 1949 |
| 2,518,625 | Langstaff | Aug. 15, 1950 |
| 2,598,207 | Bailey | May 27, 1952 |
| 2,604,246 | Hood | July 22, 1952 |